Patented Mar. 2, 1954

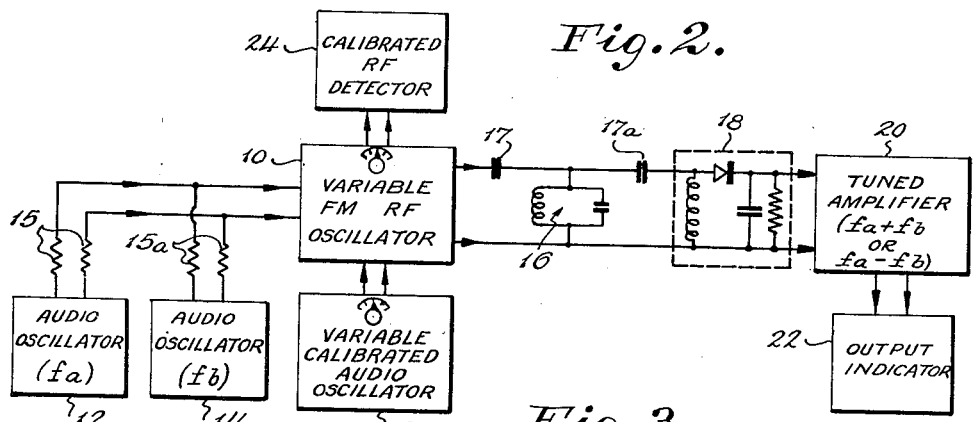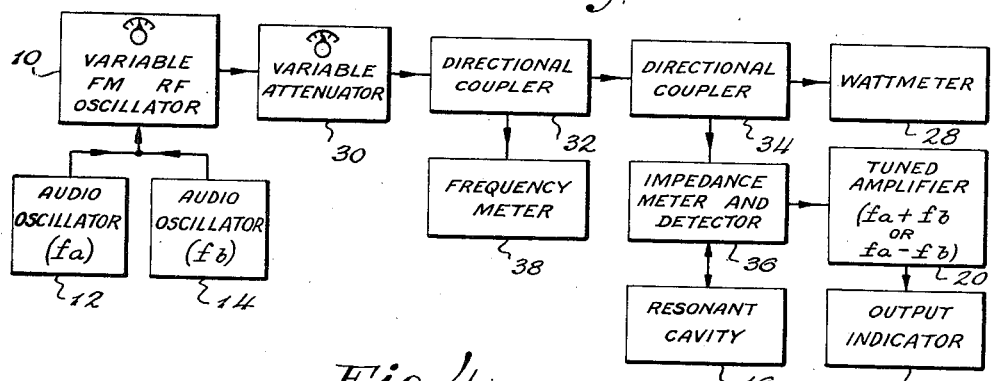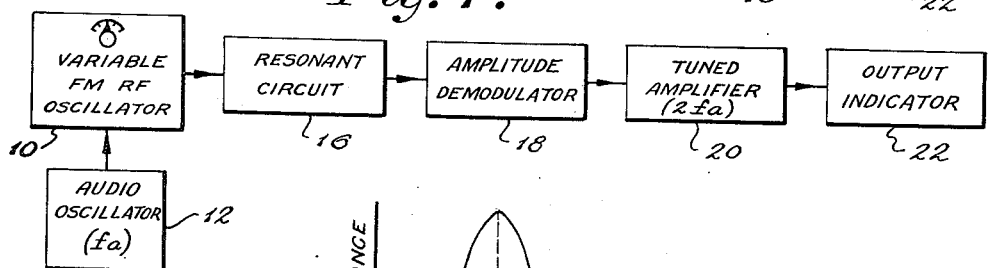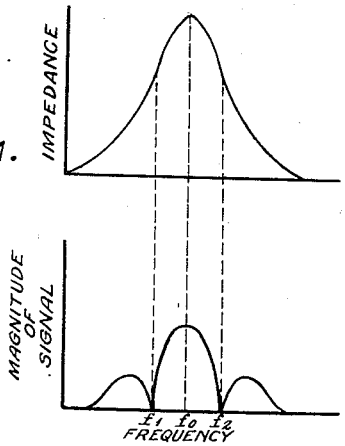
INVENTOR
NELSON E. BEVERLY
BY
ATTORNEY

2,671,198

UNITED STATES PATENT OFFICE 2,671,198

METHOD AND APPARATUS FOR MEASURING THE FREQUENCY RESPONSE OF TRANSLATING DEVICES

Nelson E. Beverly, Williston Park, N. Y., assignor to The Sperry Corporation, Great Neck, N. Y., a corporation of Delaware Application April 12, 1951, Serial No. 220,573

12 Claims. (Cl. 324—57)

This invention relates to methods and apparatus for measuring the frequencies at which the response or impedance characteristic of a translating device is substantially linear with respect to frequency, and particularly to methods and apparatus for measuring the Q of a translating device such as a resonant circuit.

The most common way of expressing the frequency response or efficiency of a resonant circuit is in terms of the Q of the circuit, which is defined as the ratio of the reactive to the active volt-amperes which the circuit will sustain when energized at the resonant frequency. In the case of a resonant circuit employing lumped constants, the Q of the circuit is ordinarily expressed as the ratio of the reactance to the effective resistance of the coil employed in the resonant circuit.

One method of measuring the Q of a resonant circuit is the half-power method, in which the frequency of the impressed energy is adjusted first for a current or voltage maximum in the circuit under test, and is next adjusted successively above and below the resonant frequency to the frequencies at which the current or voltage becomes 0.707 of the previously obtained maximum. For practical purposes, the Q of the circuit is equal to the resonant frequency divided by the difference between the frequencies at which the current or voltage becomes 0.707 of the maximum.

Another method of measuring the Q of a coil is to employ the coil and a capacitor as a series resonant circuit and to measure the ratio of the voltage across the coil or the capacitor to the impressed voltage, which ratio is equal to the Q of the coil.

Both of these methods are subject to inaccuracies and require great care in making the various measurements, particularly at high frequencies.

These difficulties in measuring the Q of a resonant circuit are overcome in the present invention by energizing the resonant circuit with a modulated radio frequency signal and deriving a signal from the translating action of the resonant circuit which has distortion components that vary in magnitude in accordance with the second derivative of the response curve of the resonant circuit. Thus, the distortion components of the derived signal are of minimum or zero amplitude at the radio frequencies at which the response of the resonant circuit is substantially linear.

The resonance curve of a resonant circuit has two inflection points at the two frequencies at which the response of the resonant circuit is substantially linear. By determining the frequencies at which the two inflection points of the resonance curve occur, it is possible to calculate the Q of the circuit. Since the frequencies at which the inflection points occur are determined by observing the two sharply defined frequencies at which the distortion components of the derived signal are of minimum or zero amplitude, the Q of the circuit can be determined with greater accuracy and ease than has been heretofore possible.

Accordingly, it is an object of the present invention to provide improved methods and apparatus for measuring the Q of a resonant circuit.

Another object of the invention is to provide apparatus for determining the frequencies at which the response of a translating device is substantially linear.

Other objects and advantages of the invention will appear from the following description, the appended claims, and the drawings, wherein Figs. 1A and 1B show wave forms which illustrate the operation of the invention; and Figs. 2 to 4 show various embodiments of the invention in block diagrammatic form.

Fig. 1A shows the resonance curve of a parallel resonant circuit in terms of impedance vs. frequency. The two inflection points along the resonance curve are located at the frequencies $f_1$ and $f_2$ respectively, and the resonant frequency is located at the frequency $f_0$.

Fig. 1B shows the magnitude of a signal which varies in accordance with the second derivative of the resonance curve shown in Fig. 1A. The curve shown in Fig. 1B indicates that the magniture of the signal passes through sharply defined minima at the frequencies $f_1$ and $f_2$ which correspond to the inflection points of the resonance curve shown in Fig. 1A. Thus, the frequencies $f_1$ and $f_2$ can be determined with great accuracy from the curve shown in Fig. 1B.

There are various ways of energizing a translating device such as a resonant circuit with a modulated radio frequency signal and deriving a signal from the resonant circuit which has distortion components which vary in magnitude in accordance with the curve shown in Fig. 1B.

If a radio frequency signal which is frequency modulated at a predetermined frequency is applied to a translating device at frequencies at which the translating device has a non-linear radio frequency response, the frequency-modulated radio frequency signal is converted by the translating device to a hybrid signal containing a frequency-modulated radio frequency signal and an amplitude-modulated radio frequency signal whose modulation envelope includes harmonic distortion of the modulating signal, the magnitude of the harmonic distortion varying in accordance with the non-linearity of the translating device.

If a radio frequency signal which is frequency-modulated at two or more frequencies is applied to a translating device at frequencies at which the translating device has a non-linear radio frequency response, the frequency-modulated signal is converted by the translating device to a hybrid signal containing an amplitude-modulated radio frequency signal whose modulation envelope includes heterodyne or intermodulation distortion of the modulating signals as well as harmonic distortion thereof, the magnitude of the heterodyne distortion varying in accordance with the non-linearity of the translating device.

However, if a frequency-modulated signal which is modulated either at a single frequency or at two or more frequencies is applied to the translating device at frequencies at which the translating device has a linear radio frequency response, the frequency-modulated signal is converted by the translating device to a hybrid signal containing a substantially undistorted amplitude-modulated signal whose modulation envelope includes no harmonic or heterodyne components of the modulating frequency or frequencies.

This implies, of course, that the frequency deviation of the frequency modulated signal must be approximately as small as, or smaller than, the band throughout which the response characteristic of the translating device is substantially linear. If the frequency deviation were made larger, it would exceed the substantially linear portion of the response characteristic and the resulting amplitude modulated signal would contain distortion components even though the carrier frequency were at the midpoint of the linear part of the response characteristic.

Thus, if a radio frequency signal which is frequency-modulated through a relatively narrow band by two audio signals having different frequencies is applied to a resonant circuit, and the amplitude-modulated signal which is thereby produced by the translating action of the resonant circuit is demodulated, the demodulated output signal will contain harmonic and heterodyne components of the modulating frequencies which vary in magnitude in accordance with the curve shown in Fig. 1B as the fundamental frequency of the frequency modulated signal is varied. The frequencies at which the sharply defined minima occur can be determined with great accuracy.

The Q of the resonant circuit is related to the frequencies $f_0$, $f_1$ and $f_2$ in accordance with the following expressions:

If the linear detector is employed to demodulate the amplitude-modulated signal, $$Q = \frac{f_0}{\sqrt{2}(f_2 - f_1)}$$

If a square law detector is employed to demodulate the amplitude-modulated signal, $$Q = \frac{f_0}{\sqrt{3}(f_2 - f_1)}$$

It will be apparent that the same results can be obtained if the resonant frequency of the resonant circuit is varied while the fundamental frequency of the frequency-modulated signal is maintained constant. In this case the tuning element of the resonant circuit must be calibrated so that the frequencies at which the sharply defined minima occur can be determined from the setting of the tuning element.

It has been found that measurement of the distortion components of the amplitude-modulated signal can be most conveniently accomplished by measurement of the amplitude of one of the first order heterodyne components since the heterodyne components provide an output signal which is less subject to interfering signals and have somewhat greater magnitude than any of the harmonic components. However, completely satisfactory results can be obtained by measuring the second harmonic component.

Fig. 2 shows apparatus which may be employed to measure the frequencies $f_0$, $f_1$ and $f_2$ so as to determine the Q of a resonant circuit by means of the heterodyne components.

A variable radio frequency oscillator 10 is frequency modulated by means of the audio signals $f_a$ and $f_b$ produced by the audio oscillators 12 and 14. Series isolating resistors 15 and 15a should be provided in the output circuits of the audio oscillators 12 and 14 so as to prevent interaction between the two audio oscillators. The amplitudes of the outputs of the oscillators 12 and 14 should be low enough to avoid varying the frequency of the oscillator 10 through a band that exceeds the width of the substantially linear parts of the frequency response characteristic of the device to be tested, as pointed out above. The output of the frequency-modulated oscillator 10 is loosely coupled to a resonant circuit 16 in a conventional manner, such as by means of the coupling condenser 17, so as to apply a constant input signal to the resonant circuit 16. Preferably, the resonant circuit 16 is parallel-connected so that the input signal can be maintained constant with greater ease. However, a series-connected circuit may be employed if desired.

An amplitude demodulator 18 which is loosely coupled to the resonant circuit 16 in a conventional manner, such as by means of the coupling condenser 17a, serves to detect the amplitude-modulated signal which is produced by the translating action of the resonant circuit 16. The amplitude demodulator 18 may be any type suitable for detecting weak signals. In the embodiment shown in Fig. 2 a square-law type employing a crystal detector is shown. Thus, in this embodiment of the invention, the Q of the resonant circuit 16 is defined by the equation $$Q = \frac{f_0}{\sqrt{3}(f_2 - f_1)}$$

The output of the amplitude demodulator 18 is applied to an amplifier 20 which is tuned to one of the first order heterodyne components of the modulating signals, i. e., $f_a + f_b$ or $f_a - f_b$. The output of the tuned amplifier 20 is connected to an output indicator 22 which serves to produce an indication which is proportional to the magnitude of the signal produced by the heterodyne component which is amplified by the tuned amplifier 20. The output indicator 22 may be an oscilloscope or a vacuum tube voltmeter, for example.

In operation, the fundamental frequency of the frequency-modulated oscillator 10 is adjusted to find the two frequencies at which the output indicator 22 indicates that the magnitude of the heterodyne component is a minimum. Thus, the frequencies $f_1$ and $f_2$ at which the inflection points of the resonance curve of the resonant circuit 16 occur are the frequencies to which the radio frequency oscillator 10 is adjusted in order to cause the output indicator 22 to indicate the two minima, and $f_0$ is substantially equal to the sum of $f_1$ and $f_2$ divided by 2.

The frequencies $f_1$ and $f_2$ to which the radio frequency oscillator 10 is adjusted may be measured by means of a calibrated dial which is employed to adjust the frequency of the oscillator 10, or it may be measured by means of a frequency meter or a frequency standard coupled to the resonant circuit of the oscillator 10.

Another way of measuring the frequencies $f_1$ and $f_2$ at which the inflection points occur is to provide a calibrated radio frequency detector 24 coupled to the radio frequency oscillator 10 and a variable calibrated audio frequency oscillator 26 which serve to frequency modulate the signal produced by the radio frequency oscillator 10. In operation, the radio frequency oscillator 10 is adjusted until the output indicator 22 indicates a null at the frequency $f_1$, and the calibrated radio frequency detector 24 is brought to zero beat with it so as to mark the frequency $f_1$. Then the radio frequency oscillator 10 is adjusted until the output indicator 22 indicates the other null at the frequency $f_2$, and the audio oscillator 26 is then turned on and its frequency is changed until the first order side band produced by its frequency modulation of the radio frequency oscillator 10 zero beats with the radio frequency detector 24. The frequency difference $f_2 - f_1$ is read directly from the calibrated audio oscillator 26. The resonant frequency $f_0$ is equal to the sum of $f_1$ and $f_2$ divided by 2.

Satisfactory results have been obtained with the apparatus shown in Fig. 2 with $f_a = 1000$ cycles per second, $f_b = 900$ cycles per second, oscillator 10 variable between 1 and 39 mc., and amplifier 20 tuned to 100 cycles per second. The frequency variations of the oscillator 10 produced by the modulating oscillators 12 and 14 should be kept as small as is feasible, consistent with practical considerations such as the gain of the amplifier 20 and the sensitivity of the output indicator 22, to make the minima at $f_1$ and $f_2$ appear as well defined nulls.

Fig. 3 shows apparatus similar to that shown in Fig. 2, which may be employed to measure the Q of a cavity resonator at ultra-high frequencies by means of heterodyne components.

As before, a variable radio frequency oscillator 10 is frequency modulated by means of the audio signals $f_a$ and $f_b$ produced by the audio oscillators 12 and 14. In this embodiment of the invention, a reflex klystron is suitable for use as the radio frequency oscillator 10.

The output of the oscillator 10 is applied to a wattmeter 28 through a variable attenuator 30 and through the primary arms of a pair of directional couplers 32 and 34. The resonant cavity 16 is loosely coupled to the secondary arm of the directional coupler 34 through an impedance meter and detector 36 such as a conventional standing-wave detector which has a crystal detector connected to the movable pickup device thereof. The output of the crystal detector of the impedance meter and detector 36 is applied to an amplifier 20 which is tuned to one of the first order heterodyne components of the modulating frequencies, i. e., $f_a + f_b$ or $f_a - f_b$. The output of the tuned amplifier 20 is connected to an output indicator 22 which may be an oscilloscope, for example.

A frequency meter 38 is connected to the secondary arm of the directional coupler 32.

In operation, the frequency of the radio frequency oscillator 10 is adjusted to the resonant frequency of the cavity 16, as shown by a maximum indication on the output indicator 22. Then the pickup device of the impedance meter and detector 36 is moved along the impedance meter to the location which provides a maximum indication on the output indicator 22. The amount of insertion of the pickup device of the impedance meter and detector 36 should be adjusted to provide a minimum of coupling between the impedance meter and detector 36 and the tuned amplifier 20 consistent with a readable indication on the output indicator 22.

The frequency of the oscillator 10 is then adjusted to find the two frequencies at which the output indicator 22 indicates minima, and the frequencies $f_1$ and $f_2$ are measured with the frequency meter 38.

The variable attenuator 30 should be adjusted so that the wattmeter 28 indicates constant power for one setting of the attenuator 30 throughout the frequency measurements.

As the oscillator 10 is tuned to frequencies on either side of the resonant frequency $f_0$, the indication on the output indicator 22 should decrease until it passes through a sharp minimum, then it should increase to a second maximum, and then it should decrease gradually to zero, as shown in Fig. 1B.

In some cases it may be desirable to maintain the frequency $f_0$ of the oscillator 10 constant and tune the cavity resonator 16 to the frequencies $f_1$ and $f_2$. This is particularly true when the resonant cavity 16 is the cavity of a frequency meter, since the frequencies $f_1$ and $f_2$ can then be read directly from the calibrated tuning mechanism of the frequency meter.

Fig. 4 shows apparatus which may be employed to measure the magnitude of the harmonic components of the amplitude modulated signal produced when a frequency-modulated signal of adjustable frequency is applied to a translating device such as a resonant circuit.

In this embodiment of the invention, the adjustable radio frequency oscillator 10 is frequency modulated by a single audio signal having a frequency $f_a$ which is produced by the audio oscillator 12. The output of the radio frequency oscillator 10 is loosely coupled to the resonant circuit 16, and the amplitude demodulator 18 is loosely coupled to the resonant circuit 16 as before.

The output of the amplitude demodulator 18 is applied to an audio amplifier 20' which is tuned to the second harmonic of the signal produced by the audio oscillator 12, i. e., to the frequency $2f_a$. The output indicator 22 is coupled to the output of the tuned audio amplifier 20' and it serves to produce an indication which is proportional to the magnitude of the second harmonic component which is amplified by the tuned amplifier 20'.

The fundamental frequency of the frequency-modulated oscillator 10 is adjusted to find the two frequencies $f_1$ and $f_2$ at which the output indicator 22 indicates that the magnitude of the second harmonic component is a minimum.

The frequencies $f_0$, $f_1$ and $f_2$ can be measured in the same manner as discussed above with reference to Fig. 2.

Although the invention disclosed herein has been described with particular reference to measurement of the Q of a resonant circuit such as a cavity resonator or one employing lumped constants, it will be apparent that it may be employed to measure the frequency or frequencies at which the response or impedance characteristic of other types of translating devices is substantially linear. For example, the invention may be employed to determine the frequencies at which the response of circuits employing distributed parameters, such as transmission lines, is linear.

Also, it will be apparent that the translating device whose frequency response or impedance characteristic is being measured need not be a resonant circuit but may be substantially any circuit having a frequency response curve which has one or more inflection points therealong.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In combination, a resonant translating device, a source of radio frequency carrier energy coupled to said translating device, means for frequency modulating said source at a fixed modulation frequency, through a frequency band that is relatively narrow as compared to the width of the response band of said translating device, detecting means coupled to said translating device, said detecting means being tuned to respond to the frequency of a distortion component of the amplitude-modulated signal produced in the translating device, means for adjusting the carrier frequency of said source to a frequency within the response band of said device that produces a minimum output from said detecting means, and means for indicating said carrier frequency.

2. Apparatus for determining the frequencies at which the inflection points of the resonance curve of a resonant circuit occur, comprising means for producing a radio frequency carrier signal, means for frequency modulating said carrier at a fixed modulation frequency, with a frequency deviation that is small compared to the frequency of said carrier, means for supplying said frequency modulated carrier signal to a resonant circuit, an amplitude demodulator having an input circuit for coupling the amplitude demodulator to the resonant circuit, and a frequency-responsive network coupled to the output of said amplitude demodulator, said network being responsive to a distortion component of the frequency at which the radio frequency signal is frequency modulated, means for adjusting the carrier frequency of said frequency modulated carrier signal to a frequency within the response band of said resonant circuit that produces a minimum output from said network, and means for indicating said carrier frequency.

3. Apparatus for determining the frequencies at which the inflection points of the resonance curve of a resonant circuit occur, comprising oscillator means for producing a radio frequency signal which is frequency-modulated simultaneously at two different fixed frequencies, means for coupling the output of said oscillator means to a resonant circuit, an amplitude demodulator having an input circuit for coupling the amplitude demodulator to the resonant circuit, and a frequency-responsive network coupled to the output of said amplitude demodulator, said network being tuned to one of the first order heterodyne components of said two frequencies at which the radio frequency signal is frequency modulated.

4. Apparatus for determining the frequencies at which the inflection points of the resonance curve of a resonant circuit occur, comprising oscillator means for producing a radio frequency carrier signal, means for frequency modulating said carrier signal at a fixed audio frequency with a frequency deviation that is small compared to said carrier frequency, means for coupling the output of said oscillator means to a resonant circuit, an amplitude demodulator having an input circuit for coupling the amplitude demodulator to the resonant circuit, and a frequency-responsive network coupled to the output of said amplitude demodulator, said network being tuned to a harmonic of said audio frequency at which the radio frequency signal is frequency modulated.

5. In apparatus for measuring the frequency response of a resonant circuit, a radio frequency oscillator coupled to said resonant circuit, means for varying the frequency relationship between the resonant frequency of said resonant circuit and the frequency of said oscillator and means for indicating said relationship, means connected to said oscillator for frequency-modulating the output thereof with at least one modulation signal that is of a fixed low frequency, and with a frequency deviation that is small compared to said radio frequency, thereby producing an amplitude-modulated radio frequency signal in said resonant circuit, an amplitude demodulator having an input circuit coupled to said resonant circuit, and a frequency-responsive network coupled to the output of said amplitude demodulator, said network being responsive to a distortion component of the signal produced at the output of said amplitude demodulator.

6. The apparatus of claim 5, wherein said frequency-modulating means comprises two oscillators tuned to two different frequencies and wherein said frequency-responsive network is tuned to the frequency of one of the first order heterodyne components of said two frequencies.

7. The apparatus of claim 5, wherein said frequency-modulating means comprises an oscillator tuned to a predetermined frequency, and wherein said frequency-responsive network is tuned to a harmonic of said predetermined frequency.

8. In combination, a resonant circuit, a radio frequency oscillator coupled to said resonant circuit, means coupled to said radio frequency oscillator for measuring the frequency of the signal produced thereby, means for varying the frequency relationship between the resonant frequency of said resonant circuit and the frequency of said radio frequency oscillator, a modulator connected to said radio frequency oscillator for frequency-modulating the output thereof at a fixed low frequency and with a frequency deviation that is small compared to said radio frequency, an amplitude demodulator having its input circuit coupled to said resonant circuit, an amplifier having its input circuit coupled to the output circuit of said amplitude demodulator, said amplifier being tuned to a distortion component of the signal produced by said amplitude demodulator which corresponds to the modulation produced by said modulator, and an indicator coupled to the output of said amplifier for indicating the magnitude of the signals produced thereat.

9. The method of determining the frequencies at which the inflection points of the resonance curve of a resonant circuit occur, comprising applying a radio frequency signal which is frequency modulated simultaneously at two different frequencies to the resonant circuit to produce an amplitude-modulated signal in the resonant circuit, varying the frequency relationship between the resonant frequency of the resonant circuit and the fundamental frequency of the frequency-modulated signal, demodulating said amplitude-modulated signal, and providing an indication of the magnitude of the component of the demodulated signal which is of the same frequency as one of the first order heterodyne frequencies of said two different modulating frequencies to determine the two frequencies at which sharply defined minima of the amplitude of the heterodyne component occur.

10. The method of determining the frequencies at which the inflection points of the resonance curve of a resonant circuit occur, comprising applying a radio frequency signal which is frequency modulated at a predetermined frequency to the resonant circuit to produce an amplitude-modulated signal in the resonant circuit, varying the frequency relationship between the resonant frequency of the resonant circuit and the fundamental frequency of the frequency-modulated signal, demodulating said amplitude-modulated signal, and providing an indication of the magnitude of a harmonic of said predetermined frequency to determine the two frequencies at which sharply defined minima of the amplitude of the harmonic component occur.

11. The method of determining the frequencies at which the response of a translating device is substantially linear, comprising applying a frequency-modulated signal to the translating device to produce an amplitude-modulated signal in the translating device, varying the fundamental frequency of the frequency-modulated signal, demodulating said amplitude-modulated signal, and providing an indication of the changes in a distortion component of the demodulated signal to determine the frequencies at which the response of the translating device is substantially linear.

12. A method for determining the frequencies of the inflection points of the resonance curve of a resonant device, comprising the steps of producing an alternating current carrier signal, frequency modulating said carrier signal at a fixed predetermined modulation frequency, impressing said signal on the resonant device to produce a resultant voltage across said resonant device, rectifying said resultant voltage, separating from said rectified resultant voltage at least one component thereof that is an amplitude distortion product of said modulation frequency, adjusting the frequency of said alternating current carrier signal to a value that makes the amplitude of said separated component have a minimum value, and determining said frequency of said carrier signal.

NELSON E. BEVERLY.

References Cited in the file of this patent

UNITED STATES PATENTS

| Number | Name | Date |
| --- | --- | --- |
| 1,641,973 | Horton | Sept. 13, 1927 |
| 2,252,058 | Bond | Aug. 12, 1941 |
| 2,380,791 | Rosencrans | July 31, 1945 |
| 2,498,548 | Howard | Feb. 21, 1950 |
| 2,614,153 | Carniol | Oct. 14, 1952 |